United States Patent [19]

Stankiewicz

[11] Patent Number: 4,964,993
[45] Date of Patent: Oct. 23, 1990

[54] MULTIPLE-USE MOLTEN METAL FILTERS

[75] Inventor: Edwin P. Stankiewicz, Warrensville Hts., Ohio

[73] Assignee: Stemcor Corporation, Cleveland, Ohio

[21] Appl. No.: 661,543

[22] Filed: Oct. 16, 1984

[51] Int. Cl.$^5$ .................... B01D 29/35; B01D 29/36
[52] U.S. Cl. .................................................. 210/510.1
[58] Field of Search ................... 55/523; 75/68 R; 210/473, 506, 510.1

[56] References Cited

U.S. PATENT DOCUMENTS

| | | | |
|---|---|---|---|
| 3,524,548 | 8/1970 | McDonald et al. | 210/510.1 X |
| 3,747,765 | 7/1973 | Nowak | 210/510.1 X |
| 4,024,056 | 5/1971 | Yarwood | 210/510.1 X |
| 4,426,287 | 1/1984 | Narumiya | 210/510.1 X |

FOREIGN PATENT DOCUMENTS 197073 4/1908 Fed. Rep. of Germany ... 210/510.1

Primary Examiner—W. Gary Jones
Attorney, Agent, or Firm—George W. Moxon, II; Joseph G. Curatolo; Larry W. Evans

[57] ABSTRACT

The present invention provides at least one cylindrical, close-ended porous, ceramic molten metal filter element connected to an essentially horizontal porous ceramic sealing plate filter element. The cylindrical element extends vertically above the elevation of that sealing plate. The molten metal flow is introduced to the exterior of the close-ended cylindrical elements and the upper surface of the plate element. The cylindrical filter body elements rest on the sealing plate, thus the sealing plate provides all of the structural support for the assembly. The molten metal flows through the porous ceramic material of the cylindrical elements and the sealing plate element to be further flowed downstream, ultimately to the associated casting molds.

59 Claims, 4 Drawing Sheets

MULTIPLE-USE MOLTEN METAL FILTERS

FIELD OF THE INVENTION

The present invention relates generally to the field of filtering impurities and inclusions from molten metal and specifically to the field of the application of porous ceramic materials to the filtration of molten metal and more specifically to the field of multiple-use porous ceramic filters for the filtration of molten metal.

BACKGROUND OF THE INVENTION

In the art of casting molten metals, the metals are first reduced to a molten state at an elevated temperature by any one of a variety of different types of furnaces. The molten state (fluid state) is produced by a furnace which may be, for examples, a fuel gas fired furnace or an electric induction furnace. The molten metal in a fluid state is flowed generally from the furnace either directly into the mold for the casting or into some sort of a secondary receiver such as, for example, a holding furnace which maintains the metal in a molten state and serves to act as an intermediary in the transport of the molten metal to the casting molds.

One of the major detriments that can occur during the casting process is for impurities, in the form of solids, to be included in the molten metal as it is finally poured into the casting molds. The inclusion of such impurities into the castings, in many cases, is cause for the castings to be rejected and thus of no commercial value except for scrap.

There are four general types of inclusions which find their way into castings. These are (1) ceramic refractories from crucibles which serve as transports for the molten metal and as the lining for the melting furnaces, (2) slags which form on or near the surface of the molten metal in the melting furnace itself, (3) oxides and nitrides from atmospheric reactions of the molten metal constituents with the ambient atmosphere both in the melting furnace and during the course of its transport to the casting molds, and (4) residual oxidation reaction products which form from the oxidation of the alloying elements (which are included in the molten metal), such as silicon, magnesium, chromium, titanium, aluminum, yttrium, tantalum, columbium, zirconium, lithium and hafnium. These oxidation reaction products are often picked up from the refractory linings within the melting furnace and the holding furnace. In addition to the foregoing, in some instances, the molten metal fluids tend to entrap dissolved gases, such as hydrogen, oxygen and nitrogen therein. During solidification of the molten metal, the gases precipitate out of solution and form gas bubbles or pockets which are also considered to be detrimental in effect to the finished metal casting.

It is known in the art of metal casting that impurities and inclusions can be removed from molten metals generally, and in particular from molten aluminum, by flowing the molten metal fluid materials through a porous refractory or ceramic filter medium to produce filtration. Reichmann U.S. Pat. No. 2,021,520 discloses the use of a porous plate, formed from the grains of fired refractory metallic oxides combined with finely divided calcined particles of metallic oxides, for performing the filtration of molten aluminum. Burroughs U.S. Pat. No. 3,235,089 discloses a bonded ceramic filter medium and the process for making it from an essentially alumina composite mixture with fluxes. McDonald et al. U.S. Pat. No. 3,524,548 discloses a porous ceramic molten metal filter of a defined composition which is to be variously shaped into either flat plates or cylindrical closed-end tubes which depend downwardly from a horizontal sealing plate. The closed-end tubes disclosed in this item of prior art are cemented to the lower side of the base plate. The cement is depended upon both for sealing and for structural support. A variation of the McDonald et al theme is shown in Nowak U.S. Pat. No. 3,747,765. Nowak discusses the problems inherent in the McDonald et al design, and the problems caused by failure of the cement. Nowak seeks to cure both the problem of the cement and the fragility of the porous ceramic structure by using metal sealing plates with a draw-bolt holding the structure together. Like McDonald et al, Nowak discloses an arrangement wherein the cylindrical closed-end tubes depend downwardly from a horizontal sealing plate.

Pryor et al. U.S. Pat. No. 3,893,917 discloses the use of an open cell ceramic foam as a molten metal filter. Pryor et al. U.S. Pat. No. 3,947,363 discloses a method of producing an open cell ceramic foam filter. Yarwood et al U.S. Pat. No. 4,024,056 discloses the adaptation of open cell ceramic foam in a plate form to the filtering of molten metal. Pryor et al. U.S. Pat. No. 4,056,586 also discloses a method for producing an open celled ceramic foam filter medium. And finally, Brockmeyer U.S. Pat. No. 4,343,704 discloses yet another method and material for producing an open celled ceramic foam filter for molten metals.

All of the foregoing types of filters and arrangements of filter media are considered, by those with skill in the art, to be variously suitable for application to molten metal fluids, for purposes of filtration, as "single application" type filters. A single application filter is a filter which is placed into the stream of a flowing molten metal fluid from only a single heat of molten metal from the melting furnace. Once the single heat of molten metal is flowed through the filter medium, the filter medium is normally removed and discarded, whether the medium is clogged with impurities, thus ending its useful life, or whether it still has potential useful life when treated as described in the next paragraph. The discarded filter medium is then replaced by a new, unused filter medium. The entrapped impurities formed on or near that surface of such filter medium, which is directly exposed to the flow of molten metal, are coated with solidified and oxidized molten metal (the residue or the last remnants of the heat of molten metal which was flowed through the filter).

There is presently no means accepted by those with skill in the field to clean, renew, or rejuvenate these spent filter media to enable their reuse short of keeping the filter medium continuously heated or keeping it continuously submerged in molten metal, or reheating the filter medium prior to the introduction of succeeding batches of molten metal, all of which are costly and tedious procedures in application. Also, when a single application filter is kept in a reusable state, under any of the foregoing procedures, the filter is never removed from situ, due to substantial difficulties encountered in handling hot filters as described in Nowak, mentioned above. Therefore, the agglomeration of impurities accumulated on the surface of the filter, known as "filter cake", "sheds" or drops off between heats. The filter cake, left after the first heat of metal, which is considered to be almost totally composed of impurities, rapidly forms again on the exposed filter medium surface during the initial start-up of the succeeding heat. Thus the ability for succeeding uses of a single application filter is drastically reduced regardless of how the filter medium is kept in the ready state.

Needless to say that the cost of replacement of spent single application filter media is also relatively great compared to that of a filter which might be used multiple times without replacement or substantial loss of ability for re-use. Thus, it is believed that there is a commercial need to develop a porous ceramic molten metal filter which can be purchased for a cost generally equivalent to the single application filters presently being used but which could be used multiple times before discard without substantial loss of ability for re-use.

SUMMARY OF THE INVENTION

The present invention provides a porous ceramic molten metal filter in the form of one or more porous ceramic, close-ended, cylindrical filter body elements connected to an essentially horizontal porous ceramic sealing plate filter element and extending vertically above the elevation of that sealing plate. The assembly is susceptible of being mounted into a molten metal holding furnace or other means of molten metal transport such that the molten metal flow is introduced to the exterior of the close-ended cylindrical elements and the upper surface of the plate element. The cylindrical filter body elements rest on the sealing plate, thus the sealing plate provides all of the structural support for the assembly. The molten metal flows through the porous ceramic material of the cylindrical elements and preferably through the sealing plate element to be further flowed downstream, ultimately to the associated casting molds. Alternatively, within the scope of the present invention, a non-porous sealing plate may be used, the material of which merely needs to be sufficiently heat resistant and resistant to corrosion and dissolution by the molten metal.

At the end of the flow of a heat of the molten metal fluid and before the flow of a succeeding heat, the metal oxides and both the filter cake impurities and the inclusions trapped adjacent to, but just beneath the exterior surface area, of the vertical closed-end cylindrical filter elements of the assembly, fall away and settle by gravity to the horizontal sealing plate element where they are again captured. This settling diminishes the cake of impurities on and adjacent to the exterior of the vertical filter elements. When a porous ceramic sealing plate is used, the settled impurities then become trapped by depth filtration in the pores of the porous ceramic sealing plate further enhancing the ability of the whole assembly to be used multiple times until substantially all of the porous ceramic material is fully loaded, deep into cross sections of the porous ceramic material, with the inclusions. The cleaning of the surface and adjacent section of the filter between heats, also tends to drive the impurities, trapped within the pores of the ceramic material, even deeper into the cross sections, thus freeing up more of the pores closer to that surface of the filter which is initially exposed to the molten metal, enabling the entrapment of additional impurities. This is known as "depth filtration" and is distinguished from "cake filtration" where the impurities are largely formed on or adjacent to the exposed surface of the filter. Those porous media which exhibit strong depth filtration tendencies will have the highest filtration efficiencies in the present invention.

Any one or more of a number of different porous ceramic or refractory materials may be used to construct the present invention, and the present invention may be constructed as a single piece or as various elements which may be cemented together with an appropriate high temperature cement. The flow of molten metal through the present invention is generated by the gravity flow of the molten metal through the porous material. The present invention is capable of producing a more inclusion-free metal, in the molten state, to be introduced to the downstream casting molds and is much more efficient in succeeding uses due to its effective localization of the caked impurities on and into the sealing plate, which frees the balance of the filter assembly for additional depth filtration.

These and other features of the present invention will be more completely disclosed and described in the following specification, the accompanying drawings and the appended claims.

DETAILED DESCRIPTION

Figure 1:
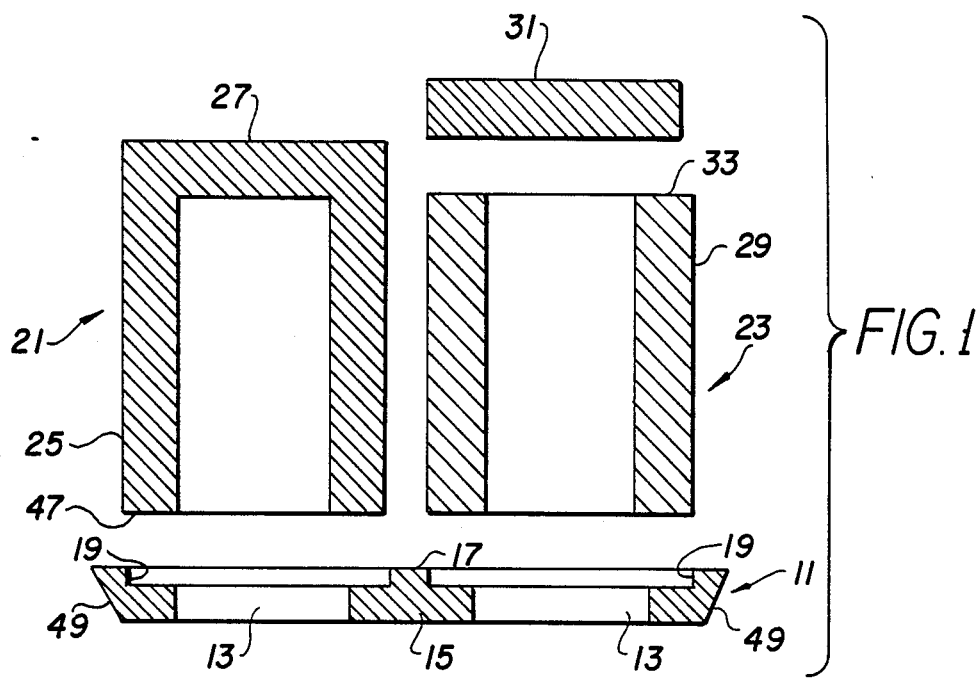
FIG. 1 is a cross sectional elevation view of a first and a second alternate embodiments of the filter elements of the present invention.

Referring to FIG. 1, there is shown a sealing plate 11 which is generally in the form of a flat plate, including ports 13 in the form of vertical bores (as shown) arranged generally symmetrically across the lower face 15 of the plate 11. The bores of the ports 13 extend perpendicular to the plane of the lower face 15 through the thickness of sealing plate 11 to the upper face 17. The ports 13 include enlarged counterbores 19 which are concentric with the ports 13 and which are sized to accept the diameters of the cylindrical filter elements 21 and 23 as shown in FIG. 1. The counterbores 19 extend perpendicularly to, and from, the upper face 17, preferably to about one-third through the thickness of sealing plate 11.

Filter element 21 is a one-piece unit, including a hollow cylindrical section 25 and a cap section 27. Filter element 23 is a two-piece unit which is fabricated from a hollow cylinder 29 and a cap 31. The cap is formed from a flat plate with rounded edges, in the form of a solid cylindrical section, and sized to match the diameter of cylinder 29. Cap 31 is cemented to the upper end 33 of cylinder 29 with any one of a number of appropriate high temperature cement compositions which are well known to those with skill in the art. An example of such a cement composition is sold under the trademark FRAXSET and is available from The Metaullics Systems Company of Solon, Ohio. Filter elements 21 and 23 may also be cemented into the counterbores 19 of sealing plate 11 using the same type of cement. Alternatively, filter elements 21 and 23 may be mounted to the counterbores 19 of sealing plate 11 with a gasket interposed between as will be explained hereinafter.

Figure 2:
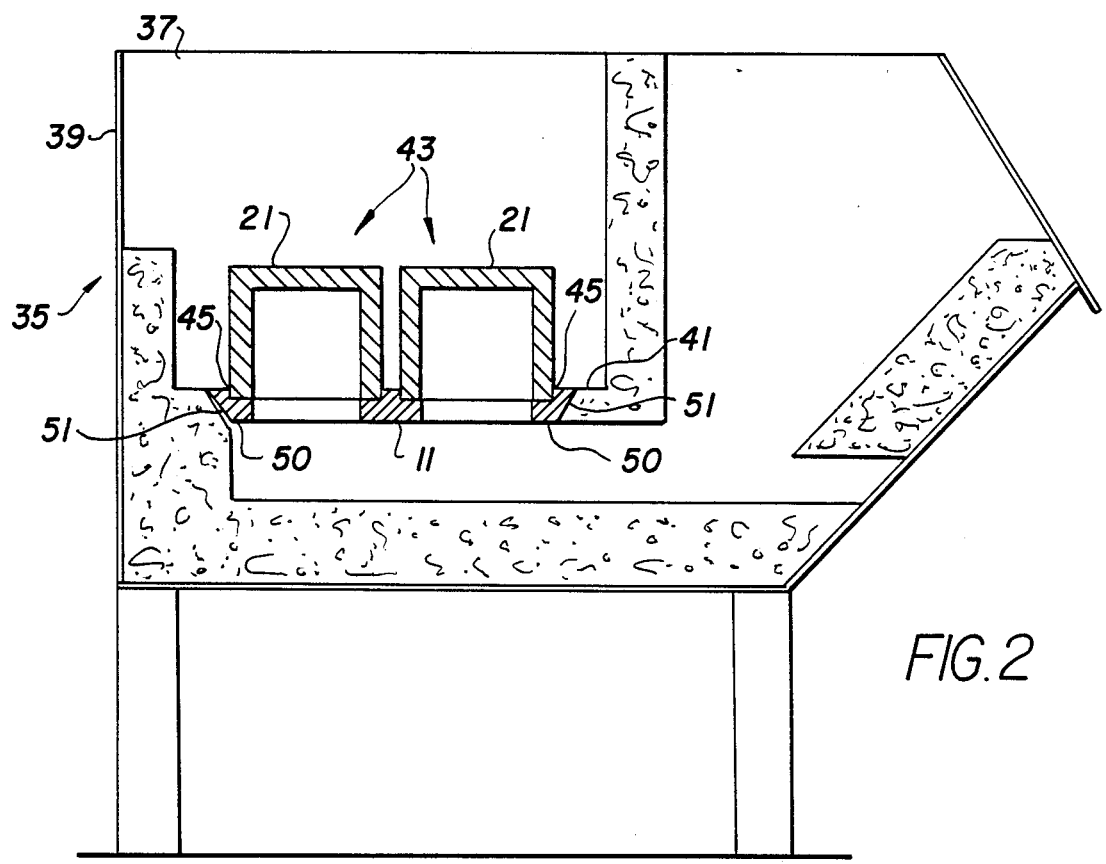
FIG. 2 is a schematic cross sectional elevation view of a molten metal holding furnace, including a first alternate embodiment of the present invention.

FIG. 2 shows one style of a molten metal holding furnace with the top removed. Holding furnace 35 includes holding chamber 37 adjacent to an entry port 39. Included as a portion of the floor 41 of holding chamber 37, is filter assembly 43 as shown in FIG. 2. Filter assembly 43 includes sealing plate 11 and two filter elements 21.

Gaskets 45 may be interposed between the counterbores 19 of sealing plate 11 and the lower ends 47 of filter elements 21 in a manner which is well known to those skilled in the art of constructing refractory liners for metal melting furnaces. An appropriate high temperature gasket material is required, many of which are commercially available. An example of such a gasket material, which is well suited for this use, is sold under the trademark FIBERFRAX DURABLANKET and is manufactured by The Carborundum Company of Niagara Fall, N.Y. Alternatively, as mentioned before, a suitable high temperature cement may be used instead of the gasket material. The purpose of either the gasket or cement comprises sealing.

Sealing plate 11 includes beveled outer edges 49. It has been found that the angle of the bevel should preferably be, from a plane perpendicular to the horizontal surface of the upper face 17 as shown in FIG. 1, within a range of 17° to 45° and, for aluminum molten metal, preferably within a range of 25° to 35° to ensure the maintenance of an adequate seal between the beveled outer edges 49 and the corresponding beveled edges 51 of the floor 41, as shown in FIG. 2. It has been observed that a beveled edge 49 angle of substantially less than 17° creates problems in insuring the seal between the sealing plate 11 from the floor 41. A beveled edge 49 angle of substantially more than 45° promotes, during start-up with a new heat, the floating of the filter assembly 43 in the surrounding molten metal due to entrapped gases and fluid turbulence.

An appropriate high temperature gasket 50 is normally interposed between beveled edge 49 of sealing plate 11 and the corresponding beveled edge 51 of floor 41. The material for the gasket 50 may be, for example, the previously mentioned FIBERFRAX DURABLANKET gasket material, or any other suitable materials as are well known to those with skill in the art of molten metal furnace fabrication.

Figure 8:
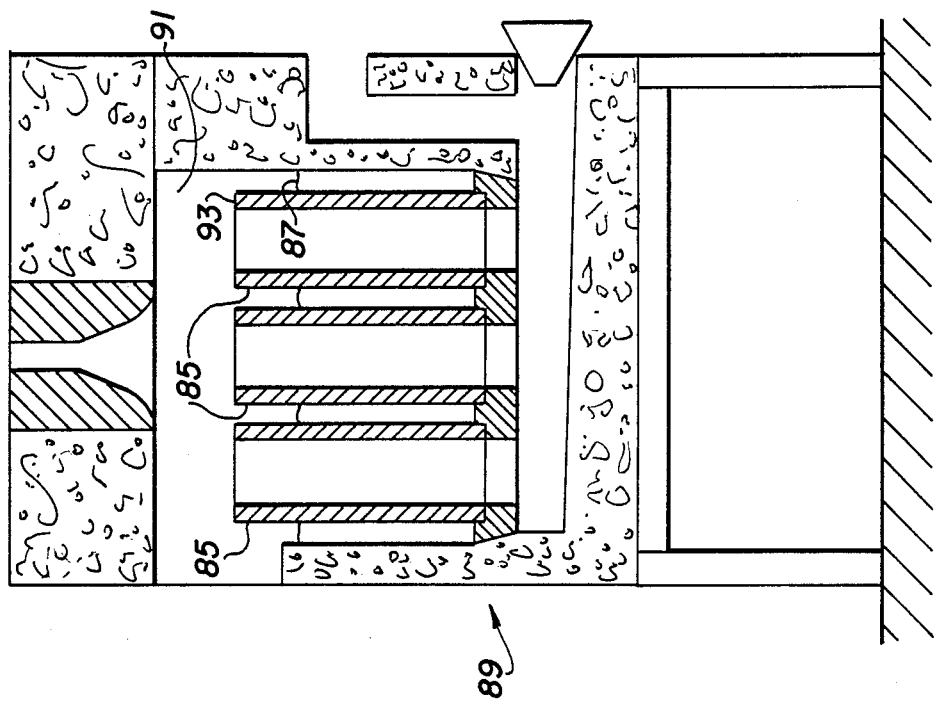
FIG. 8 is a schematic cross sectional elevation view of yet another holding furnace, similar to that shown in FIGS. 4 and 5 but including a fifth alternate embodiment of the present invention, which does not include a cap element.

In all of the embodiments except that shown in FIG. 8, in operation, the molten metal is introduced into the holding chamber 37 through entry 39, as exemplified in FIG. 2, in a quantity sufficient to ensure that the filter assembly 43 is completely submerged therein. Once the holding chamber 37 is so filled, additional molten metal is continuously introduced into the holding chamber at a rate which is equivalent to the flow of molten metal through the filter assembly 43. Thus the level of the molten metal is, preferably at all times, maintained above the elevation of the filter assembly 43. In the embodiment shown in FIG. 8, the cylindrical filter elements 85 extend above the molten metal level 87, and thus no cap elements are required. And the level of molten metal introduced into the holding chamber 91 is maintained below the upper ends 93 of cylindrical elements 85.

Figure 3:
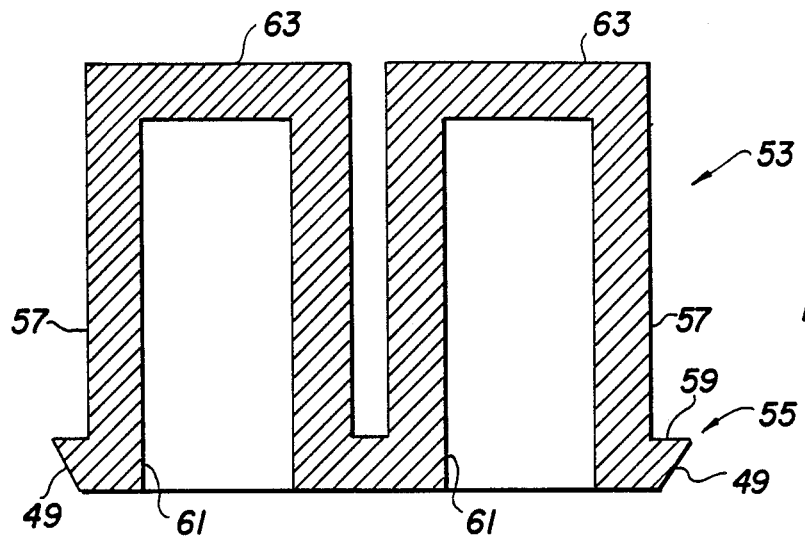
FIG. 3 is a cross sectional elevation view of a third alternate embodiment of the present invention.

In FIG. 3 there is shown a third alternate embodiment of the filter assembly 53. This alternate embodiment is a onepiece filter assembly which includes, what otherwise would be distinguished as the cap, cylinder and sealing plate, but which is, instead, a one-piece assembly. This alternate embodiment includes sealing plate element 55 which is identical to sealing plate 11 except that sealing plate element 55 does not contain ports 13 and counterbores 19. Instead, cylindrical elements 57 extend from the upper face 59 of sealing plate element 55, as shown in FIG. 3, as an integral extension of sealing plate element 55, being a one-piece extension thereof. Cylindrical elements 57 have internal bores 61 which are concentric with the exterior surfaces of cylindrical elements 57.

At the upper ends of cylindrical elements 57, remote from sealing plate element 55, are located cap elements 63. Cap elements 63 are integral extensions of the cylindrical element 57, being integrated as single piece extensions thereof. Because of the one piece fabrication of filter assembly 53, no high temperature cements or other sealing means are used.

Figure 4:
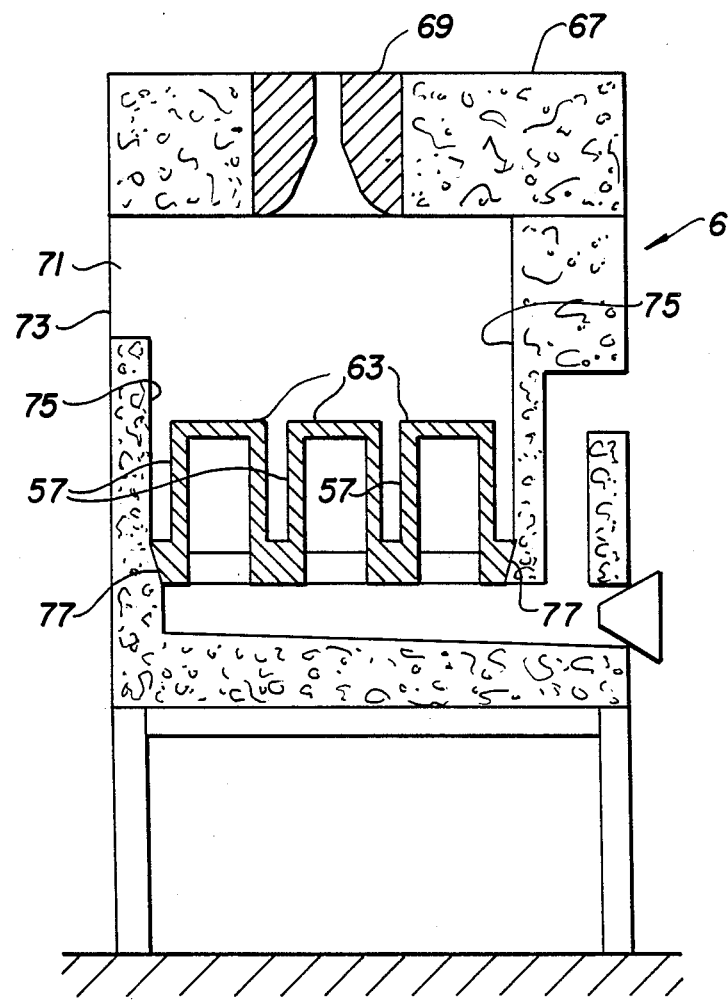
FIG. 4 is a schematic cross sectional elevation view of a slightly different holding furnace, than that shown in FIG. 2, with a fourth alternate embodiment of the present invention included.

Referring to FIG. 4, there is shown a second arrangement of a molten metal holding furnace with a filter assembly similar to the filter assembly 53, the only difference being that filter assembly 53, as shown in FIG. 3, includes a pair of cylindrical elements 57 and cap elements 63, whereas the filter assembly shown in FIG. 4 includes at least three cylindrical elements 57 and cap elements 63, and sealing plate element 55 is arranged accordingly to accomodate such a number of cylinder elements 57.

Holding furnace 65 as shown in FIG. 4 is arranged somewhat differently from holding furnace 35 as shown in FIG. 2. One distinct difference is that holding furnace 65 as shown in FIG. 4 includes its top 67, with burner 69 interposed therethrough. The purpose of burner 69 is to heat up the holding chamber 71 of holding furnace 65, and to maintain the temperature within holding chamber 71 to a sufficiently elevated degree to maintain the molten metal, which is introduced into holding chamber 71 through entry 73, in a molten state as is well known to those with skill in the field of metal casting. Also, burner 69 serves to maintain the holding chamber 71 and filter assembly 53 at an elevated temperature between heats which serves to enhance the ability of the shedding or dropping-off of the filter cake impurities. Alternatively, burner 69 could be replaced by suitable electric heating element means.

In holding furnace 65, the floor of holding chamber 71 is absent. Instead, the bottoms of vertical walls 75 are tapered in the same direction and to the same degree as the beveled edges 51 of floor 41 as shown in FIG. 2. In holding furnace 65, sealing plate element 55 actually forms the floor of holding chamber 71, and is mounted within beveled edges 77 in a manner identical to that in which sealing plate 11 is mounted to beveled edges 51 as shown in FIG. 2.

A gasket material is preferably interposed between sealing plate element 55 and beveled edges 77 and the gasket material is, for example, a FIBERFRAX DURABLANKET gasket material, or some other suitable high temperature-resistant, refractory-type gasketing material as is well known to those with skill in the art of melting furnace fabrication. In all other respects, the arrangement and mode of operation of holding furnace 65 is identical to that described in relation to holding furnace 35, shown in FIG. 2.

Figure 5:
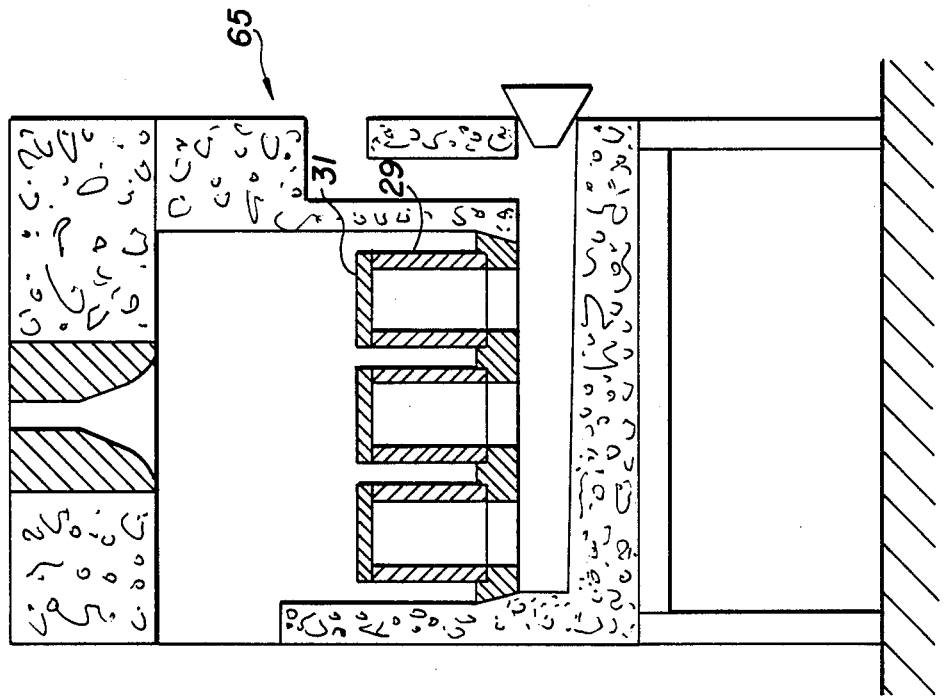
FIG. 5 is a schematic cross sectional elevation view of a holding furnace, similar to that shown in FIG. 4, but including a fifth alternate embodiment of the present invention.

FIG. 5 shows holding furnace 65 but with yet another alternate embodiment of a filter assembly 79, according to the present invention. The construction of filter assembly 79 is identical to that which has previously been described regarding filter element 23, and including cylinder 29, cap 31 and sealing plate 11, with the exception being that there are at least three filter elements 23, at least three cylinders 29 and at least three caps 31, and sealing plate 81 includes a corresponding numbers of ports 13 and counterbores 19. In all other respects, filter assembly 79 is identical in its construction to that which has been described in relation to filter element 23, cylinder 29, cap 31 and sealing plate 11. Also, filter assembly 79 is mounted into holding furnace 65 in an identical manner described for the mounting of filter assembly 53 into holding furnace 65 as shown in FIG. 4.

Figure 6:
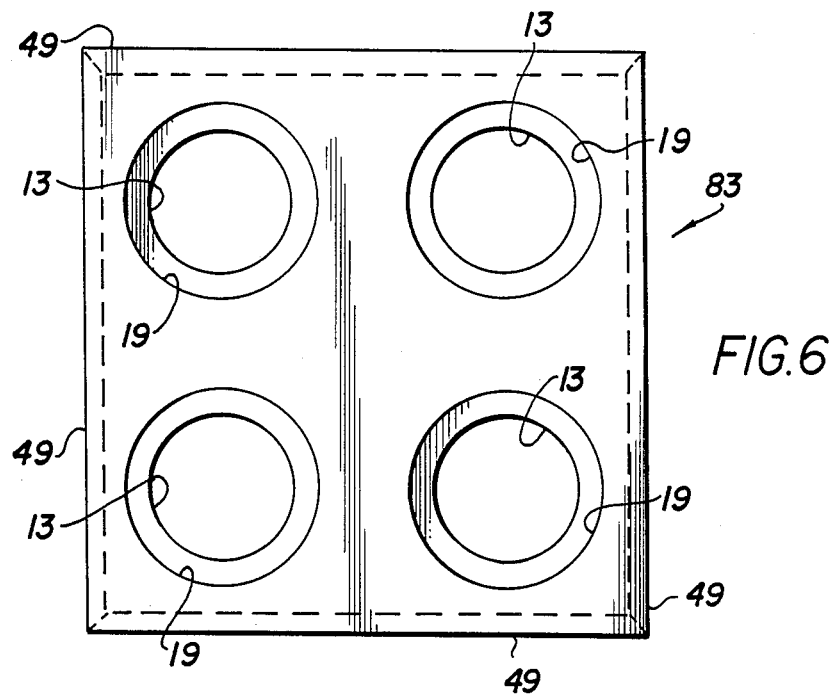
FIG. 6 is a plan view of the sealing plate to which the close-ended cylinder elements of the present invention are connected in several alternative embodiments of the present invention.

Referring to FIG. 6, there is shown sealing plate 83 in a plan view. As shown, sealing plate 83 includes a total of four ports 13 and four counterbores 19 as described in relation to sealing plate 11. Beveled edges 49 of sealing plate 83 are equivalent to those beveled edges 49 of sealing plate 11 as described hereinabove.

Thus, by reviewing the alternate embodiments described above, it is clear and intended that any number of cylinders 29, cylinder sections 25, or cylindrical elements 57 may be mounted to a sealing plate 11, 81 or a sealing plate element 55, as previously described, within the scope of the present invention.

Figure 7:
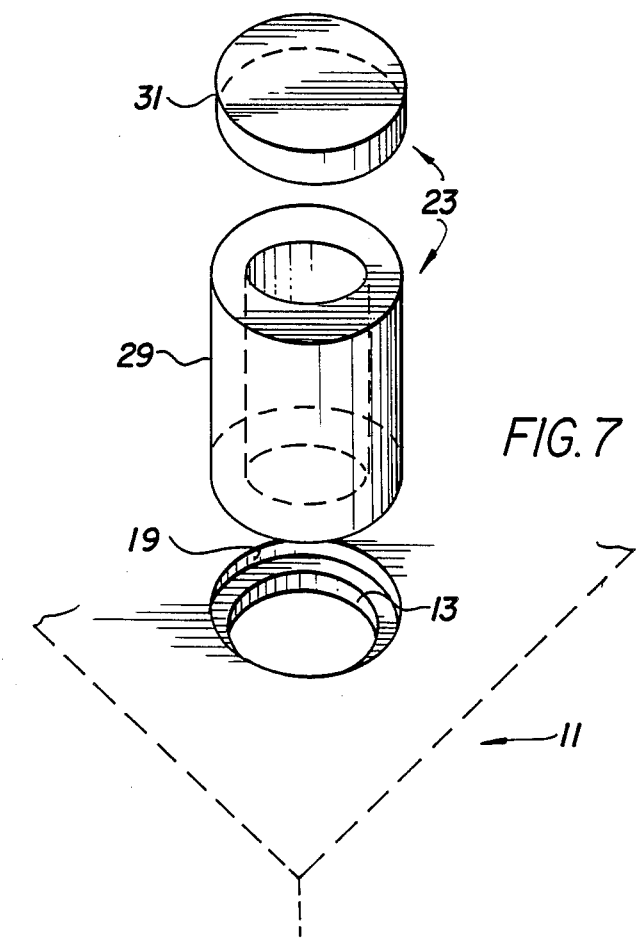
FIG. 7 is an exploded projection view of a portion of the sealing plate, the cylinder element and the cap element of a second alternate embodiment of the present invention.

FIG. 7 shows a three-dimensional projection view of a portion of sealing plate 11, in dotted line outline, but including a port 13 and a counterbore 19. Also shown in FIG. 7 is filter element 23 including cylinder 29 and cap 31 in an exploded view.

FIG. 8 shows a holding furnace 89 which is similar to those shown in FIGS. 4 and 5. In this alternate embodiment of the present invention, cylindrical elements 85 extend above the level 87 of the molten metal fluid in the holding chamber 91. Thus, no cap element is required. The level 87 of the molten metal in holding chamber 91 is, at all times, maintained below the upper end 93 of cylindrical elements 85. In all other respects this alternate embodiment may be arranged identically to any of the previously described alternate embodiment, although, as shown in FIG. 8, the embodiment there appearing is most closely associated with the embodiment shown in FIG. 5.

Various porous ceramic materials are suitable as materials for the construction of the present invention. As shown in the prior art, many of these porous ceramic materials are known. For example, a suitable porous bonded ceramic filter material is sold as METAULLICS (trademark) glass-bonded filter medium by The Metaullics Systems Company of Solon, Ohio. As another example, a suitable porous ceramic foam material is manufactured by Astro Met Associates, Inc. of Cincinnati, Ohio and is sold under the trademark "AmPorOx T".

Pore size of the ceramic material, preferably, will range from an average of 0.02 inch diamater to an average of 0.08 inch diameter. For use with aluminum, it is recommended that the pore size be maintained within the range of an average of 0.04 inch diameter to an average of 0.08 inch diameter and ideally at an average of about 0.052 inch diameter. The pore sizes for the ceramic material are specified to balance the needs for freeflow of molten metal through the pores of the ceramic material against the need for the pores to be small enough to entrap or exclude inclusions and to promote a tortuous path for the molten metal flowing through the filter to enhance and increase the residence time of the molten metal within the pores of the ceramic material. Those porous ceramic filter materials which exhibit strong depth filtration tendencies will tend to have the best filtration efficiencies in the present invention.

Density of the material, of the present invention, is only required to be sufficient to ensure sufficient structural strength capable of holding the weight of the molten metal fluid above the filter assembly. Also, the ceramic material used must not be corroded or dissolved by the molten metal and should be capable of withstanding elevated temperatures, above the highest temperature of the molten metal fluid which is to come into contact with the filter assembly, for a sustained period of time. For example, the filter assembly for use with molten aluminum should preferably be capable of withstanding a sustained elevated temperature of about 1,750° F. for an extended period of time, although the molten aluminum which is flowed through the filter normally will be within a range of about 1,250° F. to about 1,600° F. The purpose of this is to ensure that long term deterioration of the porous ceramic filter will not occur due to variations, which occur momentarily from time to time, in the maximum temperature of the molten metal.

In practice, the repeated holding of molten metal fluid, between heats, serves to allow cake impurities, which have built up on the exterior surface of the vertical elements, the time required to shed and settle, by gravity, to the sealing plate where they are again captured by depth filtration and cake accumulation. This settling tends to "wash" the exterior surface of the filter and remove any buildup of oxides and other larger inclusions, thus rendering the filter assembly of the present invention capable of multiple uses. This "washing" action, which actually occurs during the holding between the start-up of succeeding heats, produces a fresh surface and serves additionally to drive inclusions, which are within the filter pores and adjacent to the filter surface in contact with the molten metal, deeper into the porous ceramic material, thus opening up the previously filled pores to hold more inclusions.

The filter assembly of the present invention may be used in a variety of different locations other than in a molten metal holding furnace. In fact, the filter assemblies of the present invention may be utilized in most locations where molten metal fluid of a sufficient temperature is being flowed for ultimate transfer from the melting furnace to the casting molds, as will be well understood by those with skill in the art.

The internal bores of the cylindrical elements of the filter assemblies of the present invention as, for example, internal bore 61 of FIG. 3, have no theoretical maximum inside diameter but should not be of such a small inside diameter to enhance metal bridging and attendant freeze-up therein. Likewise the spaced apart relationships of the cylindrical elements of the filter assembly of the present invention need only to be great enough to prevent molten metal freeze-up and bridging. It has been found that the internal bores of the cylindrical elements or cylinder section should, preferably, be no less than about 1⅜ of an inch minimum.

The filter assembly of the present invention includes substantially greater surface area than that which is found in the prior art. This greater surface area, combined with a substantial thickness of the cross sectional walls of the various elements thereof, serves to increase the ability of the filter assembly of the present invention to be used for multiple applications. The minimum wall thickness of each of the sections of the elements of the present invention should be, preferably, no less than about ⅛ of an inch.

According to the provisions of the Patent Statutes, the principle, preferred alternative constructions and the mode of operation of the present invention have been explained and what are considered to be its best alternate embodiments have been illustrated and described. However, it is to be understood that, within the scope of the appended claims, the present invention may be practiced otherwise than as specifically illustrated and described herein.

What is claimed is:

1. A filter medium, containing at least one porous ceramic portion, substantially all of said at least one porous ceramic portion of which is capable of functioning to filter molten metal which is flowed therethrough, forming a flow path, comprising:

(a) a sealing plate means of heat resistant material including an upper and lower surface when positioned substantially horizontally and at least one cross-sectional thickness;

(b) at least one hollow cylindrical element means of porous ceramic material, containing at least one wall which includes at least one cross-sectional thickness and at least one end, mountable to and projecting perpendicularly from said upper surface of, and structurally supported by, said sealing plate means, said at least one cross-sectional thickness of said at least one wall of said at least one cylindrical element means being generally equivalent to said at least one cross-sectional thickness of said sealing plate means, said sealing plate means which forms a junction with each of said at least one hollow cylindrical element means such that a surface of said sealing plate means is positioned adjacent to at least one exterior surface of said at least one hollow cylindrical element means, said at least one hollow cylindrical element means of porous ceramic material which functions to shed, and cause to fall of said at least one exterior surface thereof, filter cake impurities, and inclusions trapped adjacent thereto from within said hollow cylindrical element means, said shedding and falling off which functions to enhance depth filtration of said hollow cylindrical element means, said functions of shedding and falling off and said function of said enhancing depth filtration both of which function to render said filter medium reusable, wherein said sealing plate and said at least one hollow cylindrical element are physically separate items and are fitted together with gasket means interposed therebetween;

(c) at least one cap element means of porous ceramic material, each containing at least one cross-sectional thickness in the form of a solid cylindrical section, mounted to said at least one end of each said at least one cylindrical element means which is remote from each of said junctions of each of said at least one cylindrical element means and said sealing plate, so as to close-off each of said at least one ends of said at least one cylindrical element means, said at least one cap element means which is generally equivalent in cross-sectional thickness to said cross-sectional thickness of said sealing plate means;

(d) port means associated with said sealing plate means which functions to provide extensions of the interior of each of said at least one hollow cylindrical element means through said sealing plate means; and (e) means for suspending said sealing plate means substantially horizontally in said flow path of molten metal which functions to cause said molten metal to flow from the exterior surfaces of each of said at least one cylindrical element means, each of said cap element means and the surface of said sealing plate means, adjacent to each of said exterior surfaces, through said sealing plate, said cylindrical element means and said cap element means and which functions to dispose said sealing plate means such that said sealing plate means functions to accumulate said impurities and said inclusions which have been shed and fallen off of said hollow cylindrical element means.

2. The invention of claim 1 wherein said filter medium is of a single piece fabrication.

3. The invention of claim 2 wherein said means for suspending said sealing plate comprises a beveled edge surrounding the periphery of said sealing plate, said beveled edge which is formed and sized to be fitted to a corresponding formed and sized second beveled edge of a surrounding element which is located in the flow path of molten metal between a melting furnace means and at least one casting mold means.

4. The invention of claim 3 further comprising a gasket means interposed between said beveled edge of said sealing plate and said corresponding second beveled edge of said surrounding element.

5. The invention of claim 4 wherein said beveled edge of said sealing plate forms an angle within a range of between about 17° to about 45° from the surface of said sealing plate from which said at least one cylindrical element projects.

6. The invention of claim 4 wherein said beveled edge of said sealing plate forms an angle within a range of between about 35° to about 45° from the surface of said sealing plate from which said at least one cylindrical element projects.

7. The invention of claim 3 wherein said beveled edge of said sealing plate forms an angle within a range of between about 17° to about 45° from the surface of said sealing plate from which said at least one cylindrical element projects.

8. The invention of claim 3 wherein said beveled edge of said sealing plate forms an angle within a range of between about 35° to about 45° from the surface of said sealing plate from which said at least one cylindrical element projects.

9. The invention of claim 1 wherein said means for suspending said sealing plate comprises a beveled edge surrounding the periphery of said sealing plate, said beveled edge which is formed and sized to be fitted to a correspondingly formed and sized second beveled edge of a surrounding element which is located in the flow path of molten metal between a melting furnace means and at least one casting mold means.

10. The invention of claim 9 further comprising a gasket means interposed between said beveled edge of said sealing plate and said corresponding second beveled edge of said surrounding element.

11. The invention of claim 9 wherein said beveled edge of said sealing plate forms an angle within a range of between about 17° to about 45° from the surface of said sealing plate from which said at least one cylindrical element projects.

12. The invention of claim 9 wherein said beveled edge of said sealing plate forms an angle within a range of between about 35° to about 45° from the surface of said sealing plate from which said at least one cylindrical element projects.

13. The invention of claim 1 wherein each of said at least one cap element(s) is a physically separate item from each of said at least one hollow cylindrical element(s) and both are fitted and joined together by a cement.

14. The invention of claim 1 wherein said means for suspending said sealing plate comprises a beveled edge surrounding the periphery of said sealing plate, said beveled edge which is formed and sized to be fitted to a correspondingly formed and sized second beveled edge of a surrounding element which is located in the flow path of molten metal between a melting furnace means and at least one casting mold means.

15. The invention of claim 14 further comprising a gasket means interposed between said beveled edge of said sealing plate and said corresponding second beveled edge of said surrounding element.

16. The invention of claim 15 wherein said beveled edge of said sealing plate forms an angle within a range of between about 17° to about 45° from the surface of said sealing plate from which said at least one cylindrical element projects.

17. The invention of claim 15 wherein said beveled edge of said sealing plate forms an angle within a range of between about 35° to about 45° from the surface of said sealing plate from which said at least one cylindrical element projects.

18. The invention of claim 14 wherein said beveled edge of said sealing plate forms an angle within a range of between about 17° to about 45° from the surface of said sealing plate from which said at least one cylindrical element projects.

19. The invention of claim 14 wherein said beveled edge of said sealing plate forms an angle within a range of between about 35° to about 45° from the surface of said sealing plate from which said at least one cylindrical element projects.

20. The invention of any one of claims 1 and 3–19 wherein said porous ceramic material contains pores which are within a size range of between about 0.02" (0.508 mm) average diametrical cross-section and about 0.08" (2.032 mm) average diametrical cross-section.

21. The invention of claim 20 wherein the cross-sectional thickness of the porous ceramic material of each element of the filter medium is at least about 0.50" (12.700 mm).

22. The invention of claim 21 wherein said sealing plate heat resistant material comprises porous ceramic material.

23. The invention of claim 20 wherein said sealing plate heat resistant material comprises porous ceramic material.

24. The invention of any one of claims 1 and 3–19 wherein said porous ceramic material contains pores which are within a size range of between about 0.04" (1.016 mm) average diametrical cross-section and about 0.08" (2.032 mm) average diametrical cross-section.

25. The invention of claim 24 wherein the cross-sectional thickness of the porous ceramic material of each element of the filter medium is at least about 0.50" (12.700 mm).

26. The invention of claim 25 wherein said sealing plate heat resistant material comprises porous ceramic material.

27. The invention of claim 24 wherein said sealing plate heat resistant material comprises porous ceramic material.

28. The invention of any one of claims 1 and 3–19 wherein the cross-sectional thickness of the porous ceramic material of each element of the filter medium is at least about 0.50" (12.700 mm).

29. The invention of claim 28 wherein said sealing plate heat resistant material comprises porous ceramic material.

30. The invention of any one of claims 1, 3–12 and 14–17 wherein said sealing plate heat resistant material comprises porous ceramic material.

31. A filter medium, containing at least one porous ceramic portion, substantially all of said at least one porous ceramic portion of which is capable of function to filter molten metal which is flowed therethrough, forming a flow path, comprising:
(a) a sealing plate means of heat resistant material including an upper and lower surface when positioned substantially horizontally, and at least one cross-sectional thickness;
(b) at least one hollow cylindrical element means of porous ceramic material, containing at least one wall which includes at least one cross-sectional thickness, mountable to and projecting perpendicularly from said upper surface of, and structurally supported by, said sealing plate means, said at least one cross-sectional thickness of said at least one wall of said at least one cylindrical element means being generally equivalent to said at least one cross-sectional thickness of said sealing plate means, said sealing plate means which forms a junction with each of said at least one hollow cylindrical element means such that a surface of said sealing plate means is positioned adjacent to at least one exterior surface of said at least one hollow cylindrical element means, said at least one hollow cylindrical element means of porous ceramic material which functions to shed, and cause to fall off of said at least one exterior surface thereof, filter cake impurities, and inclusions trapped adjacent thereto from within said hollow cylindrical element means, said shedding and filling off which functions to enhance depth filtration of said hollow cylindrical element means, said functions of said shedding and falling off and said function of said enhancing depth filtration both of which function to render said filter medium reusable, wherein said sealing plate and said at least one hollow cylindrical element are physically separate items and are fitted together with gasket means interposed therebetween;

(c) port means associated with said sealing plate means which functions to provide extensions of the interior of each of said at least one hollow cylindrical element means through said sealing plate; and (d) means for suspending said sealing plate means in said flow path of molten metal which functions to cause said molten metal to flow from the exterior surfaces of each of said at least one cylindrical element means and the surface of said sealing plate means through said cylindrical element means, and which functions to dispose said sealing plate means such that said sealing plate means functions to accumulate said impurities and said inclusions which have been shed and fallen off of said hollow cylindrical element means.

32. The invention of claim 31 wherein said filter medium is of a single piece fabrication.

33. The invention of claim 31 wherein said means for suspending said sealing plate comprises a beveled edge surrounding the periphery of said sealing plate, said beveled edge which is adapted to be fitted to a corresponding second beveled edge of a surrounding element which is located in the flow path of molten metal between a melting furnace means and at least one casting mold means.

34. The invention of claim 33 further comprising a gasket means interposed between said beveled edge of said sealing plate and said corresponding second beveled edge of said surrounding element.

35. The invention of claim 33 wherein said beveled edge of said sealing plate forms an angle within a range of between about 17° to about 45° from the surface of said sealing plate from which said at least one cylindrical element projects.

36. The invention of claim 33 wherein said beveled edge of said sealing plate forms an angle within a range of between about 35° to about 45° from the surface of said sealing plate from which said at least one cylindrical element projects.

37. The invention of claim 31 wherein said means for suspending said sealing plate comprises a beveled edge surrounding the periphery of said sealing plate, said beveled edge which is formed and sized to be fitted to a correspondingly formed and sized second beveled edge of a surrounding element which is located in the flow path of molten metal between a melting furnace means and at least one casting mold means.

38. The invention of claim 37 further comprising a gasket means interposed between said beveled edge of said sealing plate and said corresponding second beveled edge of said surrounding element.

39. The invention of claim 38 wherein said beveled edge of said sealing plate forms an angle within a range of between about 17° to about 45° from the surface of said sealing plate from which said at least one cylindrical element projects.

40. The invention of claim 38 wherein said beveled edge of said sealing plate forms an angle within a range of between about 35° to about 45° from the surface of said sealing plate from which said at least one cylindrical element projects.

41. The invention of claim 37 wherein said beveled edge of said sealing plate forms an angle within a range of between about 17° to about 45° from the surface of said sealing plate from which said at least one cylindrical element projects.

42. The invention of claim 37 wherein said beveled edge of said sealing plate forms an angle within a range of between about 35° to about 45° from the surface of said sealing plate from which said at least one cylindrical element projects.

43. The invention of claim 31 wherein said means for suspending said sealing plate comprises a beveled edge surrounding the periphery of said sealing plate, said beveled edge which is adapted to be fitted to a corresponding second beveled edge of a surrounding element which is located in the flow path of molten metal between a melting furnace means and at least one casting mold means.

44. The invention of claim 43 further comprising a gasket means interposed between said beveled edge of said sealing plate and said corresponding second beveled edge of said surrounding element.

45. The invention of claim 44 wherein said beveled edge of said sealing plate forms an angle within a range of between about 17° to about 45° from the surface of said sealing plate from which said at least one cylindrical element projects.

46. The invention of claim 44 wherein said beveled edge of said sealing plate forms an angle within a range of between about 35° to about 45° from the surface of said sealing plate from which said at least one cylindrical element projects.

47. The invention of claim 43 wherein said beveled edge of said sealing plate forms an angle within a range of between about 17° to about 45° from the surface of said sealing plate from which said at least one cylindrical element projects.

48. The invention of claim 43 wherein said beveled edge of said sealing plate forms an angle within a range of between about 35° to about 45° from the surface of said sealing plate from which said at least one cylindrical element projects.

49. The invention of any one of claims 31 and 37–48 wherein said porous ceramic material contains pores which are within a size range of between about 0.02" (0.508 mm) average diametrical cross-section and about 0.08" (2.032 mm) average diametrical cross-section.

50. The invention of claim 49 wherein the cross-sectional thickness of the porous ceramic material of each element of the filter medium is at least about 0.50" (12.700 mm).

51. The invention of claim 50 wherein said sealing plate heat resistant material comprises porous ceramic material.

52. The invention of claim 49 wherein said sealing plate heat resistant material comprises porous ceramic material.

53. The invention of any one of claims 31 and 37–48 wherein said porous ceramic material contains pores which are within a size range of between about 0.04" (1.016 mm) average diametrical cross-section and about 0.08" (2.032 mm) average diametrical cross-section.

54. The invention of claim 53 wherein the cross-sectional thickness of the porous ceramic material of each element of the filter medium is at least about 0.50" (12.700 mm).

55. The invention of claim 54 wherein said sealing plate heat resistant material comprises porous ceramic material.

56. The invention of claim 53 wherein said sealing plate heat resistant material comprises porous ceramic material.

57. The invention of any one of claims 31 and 37–48 wherein the cross-sectional thickness of the porous ceramic material of each element of the filter medium is at least about 0.50" (12.700 mm).

58. The invention of claim 57 wherein said sealing plate heat resistant material comprises porous ceramic material.

59. The invention of any one of claims 31 and 37–48 wherein said sealing plate heat resistant material comprises porous ceramic material.

* * * * *